(No Model.) 2 Sheets—Sheet 2.

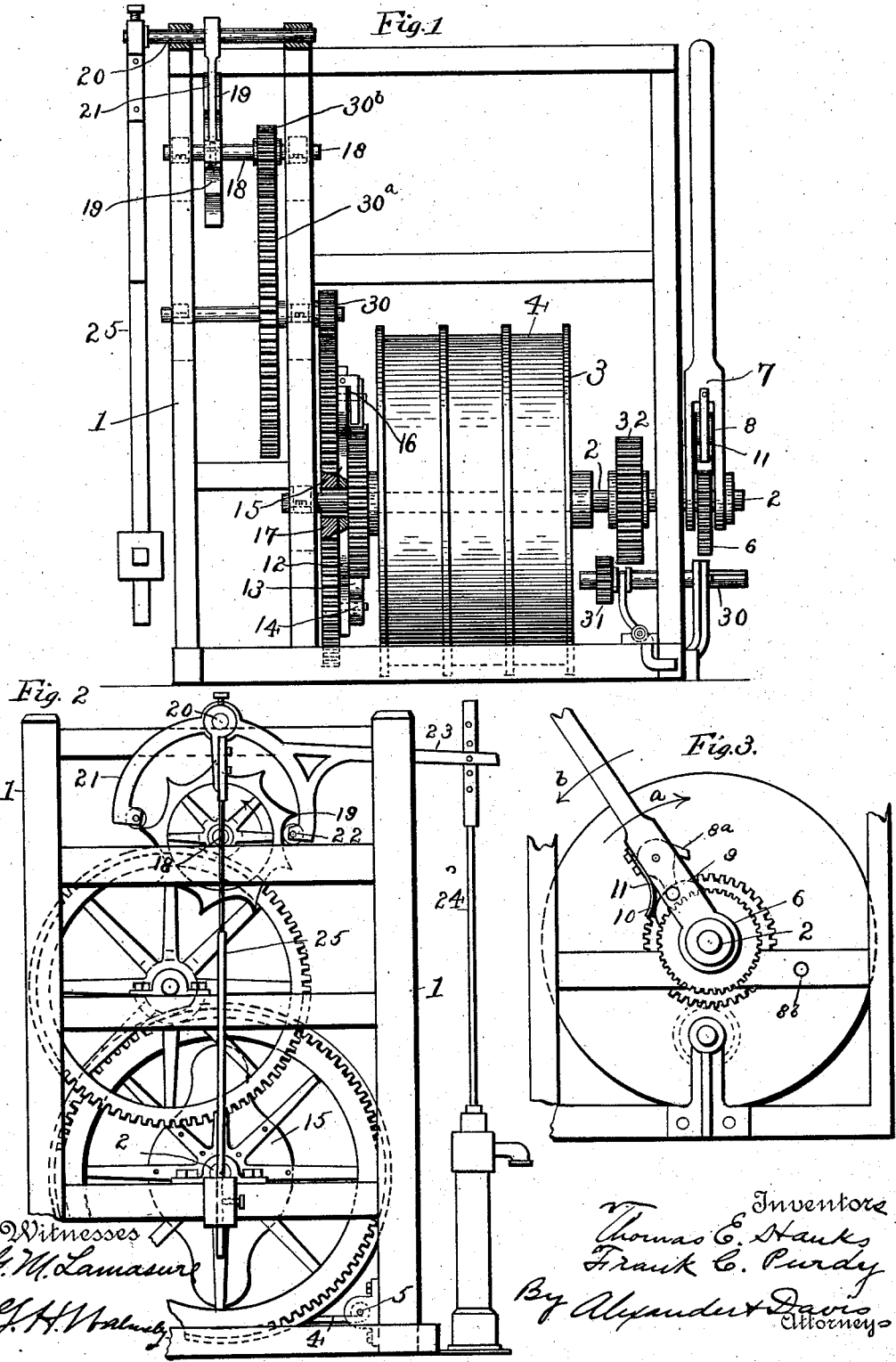

T. E. HANKS & F. C. PURDY.
SPRING PUMPING MACHINE.

No. 576,963. Patented Feb. 9, 1897.

Witnesses

Inventors
Thomas E. Hanks
Frank C. Purdy
By Alexander Davis
Attorneys

UNITED STATES PATENT OFFICE.

THOMAS E. HANKS AND FRANK C. PURDY, OF STERLING, KANSAS, ASSIGNORS TO THE SPRING PUMPING MACHINE COMPANY, OF SAME PLACE.

SPRING PUMPING-MACHINE.

SPECIFICATION forming part of Letters Patent No. 576,963, dated February 9, 1897.

Application filed January 7, 1896. Serial No. 574,652. (No model.)

*To all whom it may concern:*

Be it known that we, THOMAS E. HANKS and FRANK C. PURDY, citizens of the United States, residing at Sterling, in the county of Rice and State of Kansas, have invented certain new and useful Improvements in Spring Pumping-Machines, of which the following is a specification, reference being had therein to the accompanying drawings, in which—

Figure 4:
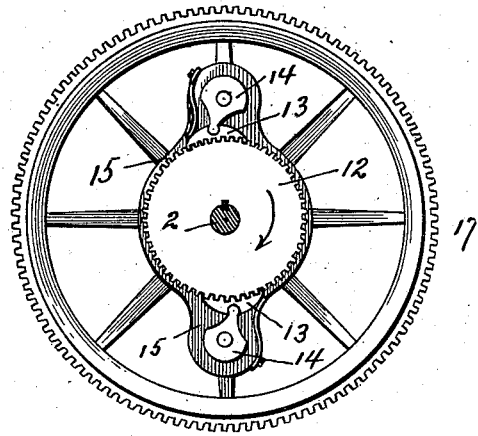
Figure 5:
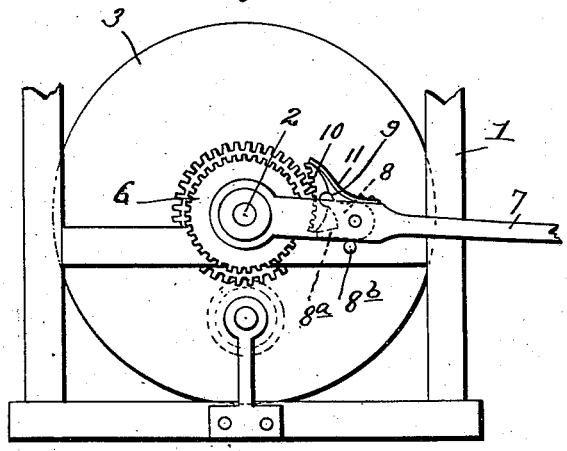
Figure 6:
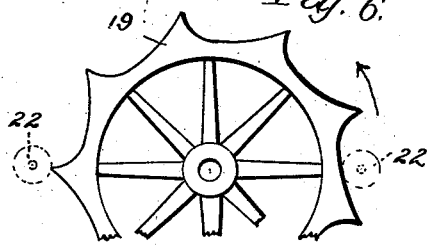

Figure 1 is a front elevation of the machine. Fig. 2 is a side elevation. Fig. 3 is a side elevation of the winding mechanism. Fig. 4 is a detail view of the clutch mechanism. Fig. 5 is a detail view of the winding mechanism, the winding-pawl being released from the winding-gear. Fig. 6 is a detail view of the pump-operating wheel.

The invention relates to improvements in motors for operating pumps and similar mechanisms; and it has for its object to provide a device of simple construction which will be positive in action and economical in the use of power.

The invention consists in the novel combination and arrangement of parts hereinafter described, and particularly pointed out in the claims appended.

Referring to the various parts by numerals, 1 designates a suitable frame in which is mounted a driving-shaft 2. On this shaft is rigidly mounted the drum 3, which is divided into three compartments, in each of which a flat spring 4 is wound. The inner ends of these springs are secured to the drum and their outer ends are secured in any suitable manner to the frame 1, as shown at 5 in Fig. 2. In order to wind the springs 4 upon the drum, we rigidly secure a notched wheel 6 on shaft 2 and loosely mount on said shaft a forked lever 7, the wheel 6 lying within the fork of the lever, as shown. Pivoted within the fork of this lever, above the wheel 6, is a dog 8, which connects at its lower end by means of a knuckle-joint 9 with a shoe 10. This shoe is curved and notched on its under side to correspond with and is adapted to fit the notched face of wheel 6, as shown. The distance from the center of the pivot of the dog 8 to the center of the notched face of shoe 10 is greater than the distance from said pivot to the notched face of the wheel 6 on a line drawn through the center of the pivot and the center of the wheel, so that said dog must extend at a slight angle to such a line, and the dog will force the shoe 10 against the wheel when forced inwardly. A leaf-spring 11 is secured to the lever 7 and bears with its free end on the shoe 10 and forces it inward to the wheel 6 and prevents the dog 8 from swinging away from the wheel, as shown.

It will thus be seen that when the lever 7 is moved in the direction indicated by arrow *a* the shoe 10 will be permitted to slip over the wheel 6, but when said lever is moved in the direction indicated by arrow *b* the shoe will be forced inwardly and will bind on the wheel 6, the shaft 2 will be revolved, and springs 4 wound on the drum 3.

The dog 8 has formed on its side opposite the spring 11 a projecting arm $8^a$, which inclines outwardly and downwardly. On the frame 1, in a suitable position to be engaged by the arm $8^a$, is a pin $8^b$. When the springs 4 have been wound upon the drum 3, the lever 7 is thrown over to the right, arm $8^a$ strikes pin $8^b$, and dog 8 is forced outwardly against spring 11, thereby carrying shoe 10 away from wheel 6, as shown in Fig. 5. This arrangement permits the springs 4 to revolve shaft 2 and the connected mechanism without carrying lever 7 around with shaft 2, as would be the case if shoe 10 were not disengaged from wheel 6, as is manifest.

On the shaft 2 on the opposite side of the drum 3 from the wheel 6 is a similarly-notched wheel 12. This wheel is secured rigidly on the shaft and is engaged by a pair of shoes 13, carried by dogs 14, which dogs are pivoted on a plate 15. These dogs and shoes are similar in construction and operate in the same manner as shoes 10 and dogs 8. Leaf-springs 16 are secured to the plate 15 and bear with their free ends on the shoes 13, which springs act in a similar manner to spring 11, carried by the lever 6. The shoes 13 engage the wheel 12 at diametrically opposite points, and two are used merely for the purpose of securing a better grip or connection between the plate 15 and the wheel 12.

The plate 15 is loosely carried by the shaft 2, and a gear-wheel 17 is rigidly secured to said plate, said gear also revolving loosely on the shaft 2.

The force of the unwinding springs revolve the shaft 2 and wheel 12 in the direction indicated by the arrow in Fig. 4, and by means of the shoes 13 and their connection with the plate 15 this motion is transmitted to the wheel 17, secured to said plate. The motion of the wheel 17 is transmitted through a train of gearing consisting of gears 30 30ᵃ and 30ᵇ 30 to a shaft 18, which carries a pump-operating wheel 19, said wheel being formed with an uneven number of teeth on its circumference, preferably nine, as shown. Mounted on a shaft 20, directly above the pump-operating wheel 19, is a yoke 21, which straddles the wheel 19, the lower ends of its arms extending approximately to the horizontal center of said wheel. Small antifriction-rollers 22 are mounted in the lower ends of these arms and bear on the wheel 19.

The teeth of the wheel 19 each comprise a cam-surface which is formed of arcs of two circles, the radius of one of the arcs being about three times as great as the other. The arc formed with the greater radius forms the greater part of the tooth, as shown in Fig. 6. These teeth are so arranged about the wheel that as the roller 22 of one arm of the yoke 21 is being operated on by the long cam of one tooth the roller 22 on the other arm of the yoke is bearing on the short cam of a tooth on the opposite side of the wheel. The object of this is to permit the roller on one arm to fall away quickly from the point of a tooth as the roller on the other arm is bearing on the long cam of a tooth on the opposite side of the wheel. This is of advantage because the power to operate the pump is applied to the yoke through the long cams, the wheel 19 revolving in the direction indicated by the arrow in Fig. 6, and it is desirable to leave the yoke free to be operated by the said long cams.

Projecting outwardly from the yoke is an arm 23, whose outer end is adjustably connected to a pump-rod 24, which rod is reciprocated when the yoke 21 is rocked by the wheel 19. A pendulum 25, provided with an adjustable weight, is secured at its upper end on the shaft 18 and aids in regulating the motion of the yoke 21.

Suitably mounted in frame 1, directly below shaft 2 and parallel therewith, is a short shaft 30, which has mounted thereon a small gear 31, said gear being adapted to slide longitudinally on said shaft. This gear is adapted to be slid into mesh with a larger gear 32, mounted on shaft 2, and the outer end of shaft 30 is adapted to receive the lever 7, gear 6, and connected shoes and dogs of the winding mechanism. By means of this mechanism great power may be applied and very strong springs wound upon the drums.

Having thus fully described our invention, what we claim is—

1. In combination with a yoke 21 mounted upon a rock-shaft 20, a pendulum 25 connected to said shaft, arm 23 carried by said yoke and adapted to be connected to a pump-rod, a wheel 19 formed with an uneven number of cam-teeth adapted to operate the yoke 21, said wheel being mounted between and operating on both arms of the yoke, each tooth of said wheel being formed of two arcs of different radius, whereby when one end of yoke 21 is operated on by that portion of a cam-tooth formed by the arc having the longer radius the other arm of the yoke will bear on that portion of a tooth formed by the arc having the shorter radius, and a driving mechanism connected to said wheel, substantially as described.

2. In combination with a suitable support, of a driving-shaft and a driving or power spring secured thereto and adapted to be wound thereon, of a winding mechanism, said mechanism consisting of a lever 7, wheel 6 secured to the driving-shaft, shoe 10 and dog 8 carried by the lever, spring 11 carried by the lever and forcing shoe 10 inwardly, arm 8ᵃ on dog 8, and a stop, as 8ᵇ, adapted to be engaged by arm 8ᵃ, substantially as described and for the purpose set forth.

In testimony whereof we affix our signatures in presence of two witnesses.

THOMAS E. HANKS.
FRANK C. PURDY.

Witnesses:
D. P. McKEE,
L. SHORES.